United States Patent Office 3,631,142
Patented Dec. 28, 1971

3,631,142
METHOD TO INCREASE THE TENSILE STRENGTH OF UNCURED RUBBERY BLOCK COPOLYMERS
Clifford W. Childers, Bartlesville, Okla., assignor to Phillips Petroleum Company
No Drawing. Filed Mar. 30, 1967, Ser. No. 626,950
Int. Cl. C08f *19/08, 47/20*
U.S. Cl. 260—33.6 A                    5 Claims

ABSTRACT OF THE DISCLOSURE

Rubbery block copolymer of a conjugated diene and a monovinyl substituted aromatic compound, or a mixture of resinous block copolymer of a conjugated diene and a monovinyl substituted aromatic compound with a sulfur vulcanizable rubbery polymer is treated with at least one of a peroxy oxygen-containing compound, an organo-aluminum halide, an inorganic acid, an inorganic halide, and a phosphorus oxyhalide.

---

This invention relates to a new and improved method for treating polymers to improve the properties of those polymers. This invention also relates to the improved polymer. This invention also relates to a new and improved method for forming polymer mixtures of improved properties and the polymer mixture resulting therefrom.

Heretofore various block copolymers have been prepared which are rubbery in character but whose green tensile strengths, i.e. tensile strength in the uncured (unvulcanized) state, are too low to be suitable for many applications unless they are first cured. Curing a polymer involves added expense and time and also can adversely affect some desirable properties of the uncured polymer.

According to one aspect of this invention, it has now been found that the uncured tensile strength of certain rubbery block copolymers and certain mixtures of resinous block coploymers with sulfur vulcanizable rubbery polymers can be improved by treating the polymer in solution with an amount of certain treating agents, hereinafter defined, sufficient to substantially improve the uncured tensile strength of the polymer.

This first aspect of the invention also relates to the treated polymer which is uncured but which has an uncured tensile strength of substantially greater magnitude than the untreated and uncured polymer.

Also heretofore, excellent high impact resin compositions have been prepared by dry blending a homopolymer of a monovinyl substituted aromatic compound such as polystyrene with a rubbery block copolymer and treating this mixture with a critical amount of a peroxy oxygen containing compound. By the use of this specific combination of materials and a critical amount of a peroxy oxygen containing compound, the tensile, elongation, and impact properties are all very substantially improved to a very surprising extent. Because of the very great and surprising increase in properties obtained and because a critical amount of the peroxy oxygen containing compound was found to be necessary, it was long thought that any variation in the dry blending procedure would most surely have the result of substantially reducing the unexpected increase in tensile, elongation, or impact properties.

It has now been found that the overall improvement in tensile, elongation, and impact properties experienced with dry blending a homopolymer of a monovinyl substituted aromatic compound and a rubbery block copolymer and treating that dry blend with a critical amount of peroxy oxygen containing compound can be maintained if the rubbery block copolymer is treated in solution with certain treating agents, hereinafter defined, thereafter removed from the solution and dried, and then dry blended with a homopolymer of monovinyl substituted aromatic compound. Not only was it surprisingly found that the tensile, elongation, and impact properties are improved in the same manner as the dry blending process described hereinabove, but also an additional advantage was found in that the amount of treating agent employed with the polymer in solution can vary widely and that the treating of the dry blended polymers with a critical amount of the peroxy oxygen containing compound is eliminated. Yet another advantage of this method is that mixing expenses are reduced because it is easier to mix a treating agent with a polymer in solution as opposed to a dry blended polymer mixture.

The second aspect of this invention also encompasses the blend of the treated polymer with the homopolymer of a monovinyl substituted aromatic compound.

Accordingly, it is an object of this invention to provide a new and improved method for making uncured polymers with improved tensile strengths. It is another object of this invention to provide an uncured polymer having improved tensile strength. It is another object of this invention to provide a new and improved method for making a blend of certain polymers with a homopolymer of a monovinyl substituted aromatic compound, which blend does not have to be treated with a critical amount of a peroxy oxygen containing compound but which blend has improved tensile, elongation, and impact properties similar to the same type of blend when treated with a critical amount of peroxy oxygen containing compound. Yet another object of this invention is to provide a blend of certain polymers and a homopolymer of a monovinyl substituted aromatic compound which blend has improved tensile, elongation, and impact properties.

According to the first aspect of this invention, there is formed in a hydrocarbon solvent, a solution of a polymer which polymer is treated in solution with certain treating agents in amounts of sufficient to substantially improve the tensile strength of the polymer when in an uncured state.

The polymers suitable for use in this first aspect of the invention include at least one rubbery block copolymer of at least one conjugated diene and at least one monovinyl substituted aromatic compound, and at least one mixture of at least one resinous block copolymer of at least one conjugated diene and at least one monovinyl substituted aromatic compound with at least one sulfur vulcanizable rubbery polymer.

The monomers used in making the rubbery block copolymers and resinous block copolymers of this invention include conjugated dienes containing from 4 to 12, preferably 4 to 10, carbon atoms per molecule, inclusive, vinyl substituted aromatic compounds and derivatives thereof which contain from 8 to 12 carbon atoms per molecule, inclusive. Examples of conjugated dienes that can be employed include 1,3-butadiene, isoprene, piperylene, 2,3-dimethyl-1,3-butadiene, 3-butyl-1,3-octadiene, 1 - phenyl-1,3-butadiene, 1,3-hexadiene, 1,3-octadiene, 4-ethyl-1,3-hexadiene, and the like. Presently preferred conjugated dienes include butadiene, isoprene, and piperylene. Examples of vinyl substituted aromatic compounds include styrene, 3-methylstyrene, 4-methylstyrene, 4-isopropylstyrene, 4-n-propylstyrene, 4-isopropylstyrene, 2,4-dimethylstyrene, 1-vinylnaphthalene, 2-vinylnaphthalene, and the like. These monomers can also be employed in making the sulfur vulcanizable rubbery polymer of this invention but the sulfur vulcanizable rubbery polymer substituent is not limited to conjugated dienes and monovinyl substituted aromatic compounds.

The rubbery and resinous block copolymers of this invention can be any block copolymers formed by a solution polymerization technique. The block structure is characterized in that the molecules of the final polymer product are composed of contiguous blocks, or segments, of different polymeric types; for example, one of the blocks forming the polymer chain can be a homopolymer of a conjugated diene or a copolymer of a conjugated diene and a monovinyl substituted aromatic compound while an adjacent block in that same chain can be a homopolymer of a monovinyl substituted aromatic compound or copolymer of a monovinyl substituted aromatic compound and a conjugated diene. It should be noted that one or more conjugated diene copolymer blocks can be present in the block copolymer used in this invention. Also, mixtures of different rubbery or resinous block copolymers can be used.

The rubbery block copolymer of this invention should be prepared using from about 40 to about 95 weight percent conjugated diene based upon the total weight of monomers employed to make that rubbery block copolymer. The remainder of the monomers employed in making the rubbery block copolymer should be one or more monovinyl substituted aromatic compounds. Preferably, the rubbery block copolymer contains at least 50 weight percent conjugated diene based upon the total weight of the monomers employed to make the rubbery block copolymer, and at least 5 weight percent of a monovinyl substituted aromatic compound in a homopolymerized form based upon the total weight of the monomers employed to make the rubbery block copolymer as determined by oxidative degradation, the remainder of the rubbery block copolymer being substantially all at least one monovinyl substituted aromatic compound.

In the rubbery block copolymer, the at least one conjugated diene block should be rubbery, i.e. contain from 50 to 100 weight percent of conjugated diene based upon the total weight of the conjugated diene block. The at least one monovinyl substituted aromatic compound block should be resinous and preferably a homopolymer of a monovinyl substituted aromatic compound such as styrene but can be a copolymer which contains at least 80 weight percent of at least one monovinyl substituted aromatic compound based on the total weight of the monovinyl substituted aromatic compound block. The rubbery block copolymer can contain from about 5 to about 75 weight percent of the monovinyl substituted aromatic compound block or blocks based on the total weight of the rubbery block copolymer.

The resinous block copolymer can contain from about 50 to about 98, preferably from about 70 to about 95, weight percent monovinyl substituted aromatic compound or compounds based on the total weight of the monomers employed to make the resinous block copolymer.

In the resinous block copolymer, the conjugated diene block or blocks should be rubbery, i.e. contain from 50 to 100 weight percent conjugated diene based upon the total weight of the conjugated diene block. Monovinyl substituted aromatic compound block or blocks are resinous, preferably a homopolymer of a monovinyl substituted aromatic compound, but can be a copolymer which contains at least 90 weight percent of at least one monovinyl substituted aromatic compound based on the total weight of the monovinyl substituted aromatic compound block, the remaining 10 or less weight percent being at least one conjugated diene. The amount of polystyrene in the resinous block copolymer can be determined by oxidative degradation.

The oxidative degradation test suitable for both the rubbery and resinous block copolymers of this invention is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene or the polystyrene units in block copolymrs containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer block is insoluble in ethanol. It is thus possible to effect a separation of the high molecular weight polystyrene which constitutes the homopolymer block of the block copolymer.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic compound with an organolithium catalyst in the presence of a hydrocarbon diluent selected from the group consisting of aromatic, paraffinic and cycloparaffinic hydrocarbons. The polymerization is generally carried out at a temperature within the range of from about −20 to about 150, preferably from about −10 to about 80, ° C. and at pressures sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compounds used correspond to the formula $R(Li)_x$, wherein R is a hydrocarbon radical selected from the group consisting of aliphatic, cycloaliphatic, and aromatic radicals and x is an integer from 1 to 4, inclusive. The aliphatic and cycloaliphatic radicals can be saturated or contain olefinic unsaturation. The R in the formula has a valence equal to the integer, and preferably contains 1 to 20, inclusive, carbon atoms, although it is within the scope of the invention to use higher molecular weight compounds. Examples of these compounds include methyllithium, isopropyllithium, n-butyllithium, tert-octyllithium, n - decyllithium, phenyllithium, naphthyllithium, 4 - butylphenyllithium, p-tolyllithium, 4 - phenylbutyllithium, cyclohexyllithium, 4-butylcyclohexyllithium, 4 - cyclohexylbutyllithium, dilithiomethane, 1,4 - dilithiobutane, 1,10 - dilithiodecane, 1,20 - dilithioeicosane, 1,4 - dilithiocyclohexane, 1,4-dilithio - 2 - butene, 1,8 - dilithio-3-decene, 1,4-dilithiobenzene, 1,4 - dilithionaphthalene, 1,2 - dilithio - 1,3-diphenylethane, 9,10 - dilithio - 9,10 - dihydroanthracene, 1,2 - dilithio - 1,3 - diphenyloctane, 1,3,5-trilithiopentane, 1,5,15 - trilithioeicosane, 1,3,5 - trilithiocyclohexane, 1,2, 5 - trilithionaphthalene, 1,3,5 - trilithioanthracene 1,3,5, 8 - tetralithiodecane, 1,5,10,20 - tetralithioeicosane, 1,2,4, 6 - tetralithiocyclohexane, 1,2,3,5 - tetralithio - 4-hexylanthracene, 1,3-dilithio-4-cyclohexene, and the like.

The amount of catalyst used in the preparation of block copolymers can vary over a wide range but will generally be at least 0.05 part by weight of the organolithium compound per 100 parts by weight of the total monomers to be polymerized in the process. The upper limit for the amount of organolithium used depends primarily upon catalyst solubility and the desired inherent viscosity of the polymer resulting from the polymerization. A preferred effective catalyst level is from about 0.1 to about 2 parts by weight of organolithium per 100 parts by weight of total monomers charged to the polymerization zone.

The hydrocarbon diluent employed can vary widely but is preferably a hydrocarbon of one of the above-mentioned types containing from 3 to 12, inclusive, carbon atoms. Examples of such diluents include propane, n-butane, isobutane, n-pentane, n-hexane, n-decane, n-dodecane, cyclohexane, cyclopentane, methylcyclohexane, benzene, toluene, xylene, and the like. Mixtures of two or more of these hydrocarbons can be employed.

Suitable methods of making block copolymers can be found in U.S. Patent 3,030,346, issued to Cooper on Apr. 17, 1962.

The block copolymers can be branched or linear. It is presently preferred that they be substantially linear.

The sulfur vulcanizable rubbery polymer component of this invention can be any type of rubber, e.g. a solution or emulsion polymerized homopolymer or copolymer such as polybutadiene, polyisoprene, copolymers of two or more conjugated dienes, random or block copolymers of conjugated dienes alone or with monovinyl substituted aromatic compounds, ethylene-propylene rubbers containing unsaturation, butadiene-acrylonitrile copolymers, and the like. Generally, the sulfur vulcanizable rubbery polymer is best defined as an elastomeric polymeric material which after conventional vulcanization with sulfur or sulphur donating compound exhibits a reversible extensibility at 80° F. of at least 100 percent of the original length of the specimen with a retraction of at least 90 percent within one minute after release of stress necessary to elongate the specimen to 100 percent. The rubbery polymer is sulphur vulcanizable in the conventional manner if that polymer contains at least two double bonds per 1000 carbon atoms in the polymer chain and any branches thereof as determined by the iodine chloride method.

The iodine chloride method employs a 0.5 gram sample of polymer which is dissolved in a 75/25 volume mixture of carbon disulfide and chloroform. The chloroform solution of iodine chloride of known concentration (0.09 to 0.10 molar) is added to the polymer solution and the mixture is then placed in a 25° C. bath for 1 hour to allow time for reaction. Thereafter, the excess of iodine chloride is titrated with 0.05 normal sodium thiosulfate. The millimoles of iodine chloride that react with one gram of sample is then calculated. A test is run using only solvent and iodine chloride and an appropriate conventional correction is made when calculating unsaturation of the polymer.

The mixture of at least one resinous block copolymer and at least one sulfur vulcanizable rubbery polymer can be made in any conventional manner such as by dry blending in a Brabender Plastograph or solution or melt blending of the polymers as is well known in the art. The mixture can have from about 2 to about 50 weight percent, preferably from about 5 to about 30 weight percent, of resinous block copolymer, based upon the total weight of the mixture, the remainder of the mixture being substantially at least one sulfur vulcanizable rubbery polymer.

The sulfur vulcanizable rubbery polymer can be formed in any conventional manner well known in the art including the procedure, catalyst, diluent, and the like set forth hereinabove with respect to the making of block copolymers.

The hydrocarbon solvent employed in making the solution of the polymer to be treated according to this invention can be any hydrocarbon which serves as a solvent for the polymer to be treated and is substantially inert to the treating agent. Preferred hydrocarbon solvents are those set forth hereinabove with respect to the making of the block copolymers. The polymer solution can be made in any manner such as by taking already formed and dried polymer and dissolving same in the hydrocarbon solvent or by simply using the polymer in the hydrocarbon solvent in which it is formed as set forth hereinabove with respect to the making of the block copolymers.

Whether the polymer is separately dissolved in the hydrocarbon solvent or is formed my polymerization in the hydrocarbon solvent, the amount of polymer in the resulting solution can vary widely. For practical reasons, it is presently preferred that the polymer solution contain from about 5 to about 15 weight percent of polymer based upon the total weight of the solution.

The polymer solution of this invention can be treated with one or more agents selected from the group consisting of peroxy oxygen containing compounds; organoaluminum halides having the formula $RmAlX_n$; sulfuric acid and phosphoric acid; inorganic acidic halides having the formula $MX_y$; phosphorus oxyhalides; and mixtures of inorganic acidic halides of the formula $MX_y$ and trihydrocarbylaluminum compounds of the formula $R_3Al$; wherein R is selected from the group consisting of saturated aliphatic, saturated cycloaliphatic, aromatic radicals, and combinations thereof each having from 1 to 20 carbon atoms, inclusive, X is a halogen, M is an element selected from the group consisting of hydrogen, zinc, cadmium, mercury, titanium, zirconium, halfnium, aluminum, gallium, indium, thallium, germanium, tin, lead, phosphorus, arsenic, antimony, bismuth, iron, nickel, and cobalt, preferably zinc, aluminum, iron, titanium, tin, phosphorus, and antimony, $m$ and $n$ are integers that can be 1 or 2 and $m+n$ equals 3, and $y$ equals the valence of M in $MX_y$. Mixtures of organo aluminum halides such as the sesquihalides can be employed.

The amount of treating agent or agents employed can vary widely but is generally that which is sufficient to improve the uncured tensile strength of the polymer or polymers treated without producing gel in the polymer. Generally, from about 0.25 to about 25 gram millimoles of treating agent or agents per 100 grams of polymer or polymers to be treated in solution can be employed.

The treating time, temperature, and pressure can vary widely depending upon the polymers, solvents, and treating agents employed as well as the magnitude of increase in tensile strength desired. Generally, the treating temperature can be in the range of from about 0 to about 125, preferably from about 25 to 75° C. The treating time can be in the range of from 5 seconds to about 50 hours, preferably from about 10 minutes to about 20 hours. The treating pressure can be ambient or below or above ambient as described depending upon the capability of the apparatus employed. The treatment step comprises mixing in any conventional manner such as by simple stirring of the treating agent into the polymer solution. Examples of suitable treating agents include peroxy compounds which include both organic and inorganic peroxides, including hydroperoxides, containing from 4 to 40 carbon atoms per molecule, inclusive. The organic peroxides can be substituted with non-peroxy members such as halogen, hydroxy radicals, ether, and/or ester linkages and the like. Suitable inorganic peroxides include calcium peroxide, barium peroxide, zinc peroxide, lead peroxide, and mixtures thereof.

Examples of suitable peroxides include: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis-(4-methyl-2-hexenyl) peroxide, bis(4-octenyl) peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis-(alpha-ethylbenzyl) peroxide, bis[diisopropyl-(4-isopropylphenyl)methyl] peroxide, bis[dimethyl-(4-tert-butylphenyl)methyl] peroxide, benzyl alpha-methylbenzyl peroxide, bis[(4-chlorobenzoyl)] peroxide, bis(2,4-dichlorobenzoyl) peroxide, bis(2-propoxy-n-hexyl) peroxide, n-pentyl 5,8-diphenyldodecyl peroxide, bis(9,10-dihydroxydecyl) peroxide, 2,5 - di(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hydroperoxide, phenyl cyclohexane hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl-(4-isopropylphenyl) hydroperoxymethane], (4-ethoxyphenyl)methyl hydroperoxide, di - n-hexyl-4-hydroxyphenylhydroperoxymethane, dimethyl(3 - methoxyphenyl)hydroperoxymethane, peroxybenzoic acid, peroxybutyric acid, peroxododecanoic acid, tert-butyl peroxybenzoate, di-tert-amyl diperoxyphthalate, and tert-dodecyl peroxyacetate.

Examples of suitable organoaluminum halides include methylaluminum dichloride, ethylaluminum dichloride, hexylaluminum dichloride, decylaluminum dibromide, pentadecylaluminum dichloride, eicosylaluminum diiodide, cyclopropylaluminum diiodide, cyclopropylaluminum dichloride, cyclopentylaluminum dibromide, cyclohexylaluminum dichloride, 4-ethylcyclohexylaluminum difluoride, 2,4,6-triethylcyclohexylaluminum dibromide, 4-n-nonylcyclohexylaluminum diiodide, benzylaluminum dichloride, phenylaluminum dichloride, 1-naphthylaluminum dibromide, 4-methylphenylaluminum dibromide, 3,5-di-n-heptylphenylaluminum dichloride, dimethylaluminum chloride, di-n-propylaluminum chloride, methyl-tert-butylaluminum bromide, di-n-heptylaluminum bromide, di-n-tridecylaluminum fluoride, di(3,5-diethyloctyl)aluminum fluoride, di(2,4,6,8-tetramethyl-10-phenyl)aluminum chloride, di(2-cyclohexylethyl)aluminum chloride, dicyclopentylaluminum iodide, di(3,4-di-n-butylcyclopentyl)aluminum fluoride, dicyclohexylaluminum chloride, diphenylaluminum bromide, dibenzylaluminum bromide, di(2,4,6-trimethylphenyl)aluminum chloride, methylaluminum sesquichloride, ethylaluminum sesquibromide, butylaluminum sesquichloride, and the like.

Suitable inorganic acidic halides include hydrogen fluoride, hydrogen chloride, zinc chloride, aluminum chloride, aluminum bromide, ferric iodide, ferric chloride, titanium tetrachloride, stannic fluoride, stannic chloride, phosphorus pentachloride, antimony pentabromide, antimony pentachloride, cadmium bromide, mercuric chloride, boron trifluoride, gallium iodide, indium chloride, thallium chloride, ferric chloride, cobalt bromide, nickel iodide, zirconium tetrabromide, hafnium tetrachloride, germanium tetraiodide, lead tetrachloride, arsenic pentachloride, arsenic pentaiodide, antimony pentafluoride, bismuth trichloride, and the like.

Suitable phosphorus oxyhalides include phosphorus oxychloride, phosphorus oxychloride dibromide, phosphorus oxybromide, phosphorus oxydichloride bromide, phosphorus oxyfluoride, and the like.

Suitable trihydrocarbylaluminum compounds include trimethylaluminum,
triethylaluminum,
triisobutylaluminum,
tri-n-decylaluminum,
tripentadecylaluminum,
trieicosylaluminum,
tricyclopentylaluminum,
tricyclohexylaluminum,
tribenzylaluminum,
tri-4-tolylaluminum,
triphenylaluminum,
tri-1-naphthylaluminum,
tri(4-cyclohexylbutyl)aluminum,
methyl di-n-octylaluminum,
2,4,6-triisopropylphenylaluminum,
dicyclopentylethylaluminum,
tri(4-n-propylheptyl)aluminum, and the like.

After treatment the polymer can be separated from solution in the conventional manner such as by alcohol coagulation or steam stripping the solvent free from the polymer and washing and drying the wet rubbery crumb in a conventional manner well known in the art. Conventional additives such as antioxidants, pigments, dyes, fillers, stabilizers, plasticizers, and the like, can be added to the polymer after treatment but while still in solution or after separation of the same from the solution.

Treated polymer can be employed as such in the uncured condition for making articles such an shoe soles, swim fins, face masks, and the like, or it can be cured in a conventional manner and then employed for making various articles.

In addition, the treated polymer can be mixed with a homopolymer of a monovinyl substituted aromatic compound having from 8 to 12 carbon atoms per molecule, inclusive, examples of which are given hereinabove with respect to the rubbery and resinous block copolymers. A presently preferred homopolymer is polystyrene. The polysterene employed can be any commercially available, general purpose polystyrene.

The amount of treated polymer is mixed with the homopolymer of the monovinyl substituted aromatic compound in amounts such that the final mixture contains at least 50 weight percent of the homopolymer based upon the total weight of the polymeric components in the mixture, the remainder being substantially all the treated polymer or polymers. Generally, the final composition can contain from about 3 to about 50, preferably from about 5 to about 40, weight percent treated polymer based on the total weight of the polymeric components. More than one homopolymer can be employed in any given mixture in addition to one or more treated polymers.

Blending of the treated polymer or polymers and one or more homopolymers of monovinyl substituted aromatic compounds can be accomplished in any conventional manner such as by use of internal mixtures such as a Banbury, twin screw extruder, Brabender Plastograph, and the like. Open mixers such as an open mill can also be employed, the ultimate desired result being an intimate mixture of the polymers in the mixture. Mixing temperatures can vary widely but for practical reasons can be in the range of from about 140 to about 260, preferably from about 145 to about 200 ° C. The mixing time can also vary widely but will generally be in the range of from about 1 to about 30, preferably from about 2 to about 15, minutes.

The polymers treated according to this invention in addition to having unusually high uncured tensile strength, can be molded when heated but become eslatomeric when cooled to room temperature or below. In other words, the treated polymers of this invention behave as a raw rubber when heated and a cured rubber when cooled. The treatment of this invention when practiced on a random copolymer of a conjugated diene and a monovinyl substituted aromatic compound does not produce the results of this invention that are obtained when using a block copolymer. Although in some cases a slight increase in tensile strength might be achieved when a random copolymer is employed, this slight increase is not sufficient to render the polymer suitable for most applications unless it is vulcanized.

EXAMPLE I

A rubbery 75/25 butadiene/styrene block copolymer and a rubbery 75/25 butadiene/styrene random copolymer were each treated in solution with ethylaluminum dichloride. The recipe was as follows:

TABLE I

| | Parts by weight |
|---|---|
| Rubber | 100 |
| Toluene | 1437 |
| Ethylaluminum dichloride (11.8 mhm.[1]) | 1.5 |
| Temperature, ° C. | 50 |
| Time, hours | 2 |

[1] Gram millimoles per 100 grams of rubber.

When ethylaluminum dichloride was added to the random copolymer solution, gel formed immediately. The gel was separated from the mixture after the two-hour reaction period. No. gel was formed when ethylaluminum dichloride was added to the block copolymer solution. The treated block copolymer and the treated random copolymer from which the gel had been removed were coagulated in isopropyl alcohol, separated, and dried in a vacuum oven at 60° C.

Inherent viscosity and gel were determined on each polymer before and after treatment and green tensile strength was determined on the treated polymers. Results were as follows:

TABLE II

|  | Block copolymer | Random copolymer |
|---|---|---|
| Inherent viscosity [2]: |  |  |
| Before treatment | 1.03 | 1.8 |
| After treatment | 1.60 | 1.95 |
| Gel, wt. percent [3]: |  |  |
| Before treatment | 0 | 0 |
| After treatment | 0 | [1] 26 |
| Tensile [4], after treatment | 790 | 145 |

[1] Gel that formed immediately after addition of ethylaluminum dichloride to polymer solution. There was 2 wt. percent gel in polymer before ethylaluminum dichloride treatment.
[2] One-tenth gram of polymer was placed in a wire cage made from 80-mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medaliatype viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weight to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e. the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.
[4] Determined according to ASTM D-638-61T, samples drawn at rate of 0.2 inch per minute.

A sample of the block copolymer before treatment could not be molded in order to obtain a test specimen for determination of green tensile strength. Tensile strength of the random copolymer before treatment was 80 p.s.i.

The data show that treatment of the block copolymer with ethylaluminum dichloride produced a significant increase in green tensile strength. Treatment of the random copolymer with ethylaluminum dichloride had little effect on tensile strength in contrast to the result obtained with the block copolymer.

The rubbery 75/25 butadiene/styrene block copolymer was prepared in n-hexane using 2.6 gram millimoles of n-butyllithium per 100 grams of monomer as the initiator. All ingredients were charge initially. Polymerization was initiated at about 66° C. and the temperature increased to about 105° C. during the reaction. On completion of the polymerization, one part by weight per 100 parts rubber of a mixture of $C_{16}$ to $C_{18}$ saturated and unsaturated fatty acids was added to inactivate the catalyst and one part by weight per 100 parts rubber of 2,6-di-tert-butyl-4-methylphenol was added as antioxidant. The mixture was steam stripped and the wet rubber crumb was washed and dried. The copolymer had a Mooney value (ML-4 at 212° F.) of about 47.

The rubbery 75/25 butadiene/styrene random copolymer was prepared in n-hexane using n-butyllithium as the initiator and 1.5 parts by weight per 100 parts by weight of total monomers of tetrahydrofuran as the randomizing agent. There was also present in the polymerization recipe 0.04 part by weight of divinylbenzene per 100 parts by weight of total monomers. Polymerization was initiated at 50° C. On completion of the polymerization one part by weight per 100 parts rubber of a mixture of $C_{16}$ to $C_{18}$ saturated and unsaturated fatty acids was added to inactivate the catalyst and 1.5 parts by weight per 100 parts rubber of 2,6-di-tert-butyl-4-methylphenol was added as an antioxidant. The mixture was steam stripped and the wet rubber crumb washed and dried. The copolymer had a Mooney value (ML-4 at 212° F.) of 53, and contained 24.5 weight percent bound styrene but no polystyrene block.

EXAMPLE II

Another rubbery 75/25 butadiene/styrene block copolymer prepared in n-hexane using n-butyllithium as the initator was treated with ethylaluminum dichloride in solution. The recipe was the same as that used in Example I except that the ethylaluminum dichloride was varied. Recovery of the treated products was the same as described in Example I. The products were gel free. Inherent viscosity, green tensile strength, and elongation were determined. The amounts of treating agent and results were as follows:

TABLE III

|  | 1 | 2 |
|---|---|---|
| Ethylaluminum dichloride used: |  |  |
| Parts per 100 parts of copolymer | 1.0 | 1.25 |
| Millimoles | 7.9 | 9.9 |
| Inherent viscosity [2] | 1.31 | 1.61 |
| Tensile, p.s.i.[3] | [1] >310 | [1] >890 |
| Elongation, percent [3] | [1] >680 | [1] >520 |

[1] Did not break at maximum elongation of the machine.
[2] Same as footnote (2), Table II, Example I.
[3] Same as footnote (4), Table II, Example I.

These data show that high green tensile strength of the block copolymer resulted from the treatment with ethylaluminum dichloride.

EXAMPLE III

Twenty-nine grams of a linear 75/25 butadiene/styrene random copolymer (rubber) prepared by solution polymerization and six grams of an 88/12 styrene/butadiene block copolymer (resin) were dissolved in 500 cc. of toluene, the reactor was flushed with nitrogen, and 0.15 gram of dilauroyl peroxide (1.09 gram millimoles per 100 grams total polymer treated) was added to the polymer solution. The temperature was maintained at 70° C. for 17 hours. The peroxide in the treated rubber composition was removed when the treated rubber was coagulated with isopropyl alcohol, separated, and dried in a vacuum oven at 60° C.

The treated rubber composition (25 parts by weight) was blended with 75 parts by weight of polystyrene ("COSDEN" 550, a trademark of and manufactured by Cosden Oil and Chemical Company). Blending was conducted in an internal mixer (Brabender Plastograph). The chamber was flushed with nitrogen and polystyrene was introduced and mixed at slow speed until it fluxed. The rubber composition was added and blended with the polystyrene at slow speed of the mixer until it fluxed. The vacuum head was closed and the chamber was evacuated. The components were then mixed five minutes with the mixer operating at 100 r.p.m. The mixing temperature varied from an initial temperature of 150° C. to a final temperature of 170° C.

After removing the blend from the mixer, it was compression molded at 350° F. into a sheet 1/16 inch in thickness. The sheet was cut into 1/2-inch strips from which dumbbell specimens and the width in the gauge length was used for the test specimens and the width in the gauge length area was 1/4 inch. Tensile strength and elongation were measured at a drawing rate of 0.2 inch per minute in accordance with ASTM D-638-61T. Notched Izod impact strength was also determined. Test specimens were 1/8 inch in thickness. Tensile strength was 3140 p.s.i. and elongation was 34 percent. Impact strength was 3 foot pounds per inch notch (determined according to ASTM D-256-56, 1/8-inch bar). These data show that the resinous composition had good properties.

The linear butadiene/styrene random polymer was prepared in three runs, each using a 75/25 weight ratio of butadiene/styrene. Polymerization for all three runs was conducted in the presence of 800 parts by weight of n-hexane and 1.5 parts by weight tetrahydrofuran as the randomizing agent, the parts by weight being based on the total weight of butadiene and styrene. The initiator was n-butyllithium. The initial temperature was 127–130° F. and the peak temperature was 200–212° F. The initiator levels and blend ratios for the three runs were as follows:

TABLE IV

| Initiator level, mhm. | Blend ratio [1] |
|---|---|
| 0.656 | 29 |
| 0.703 | 29 |
| 0.782 | 42 | mhm.—gram millimoles per 100 grams total monomers.
[1] Parts by weight per 100 parts total composition.

On completion of the polymerization, one part by weight per 100 parts rubber of a mixture of $C_{16}$ to $C_{18}$ saturated and unsaturated fatty acids was added to inactivate the catalyst and one part by weight per 100 parts copolymer of 2,6-di-tert-butyl-4-methylphenol was added as antioxidant. The mixture was steam stripped and the wet rubber crumb was washed and dried.

The 88/12 butadiene/styrene block copolymer employed in the compositions was prepared in accordance with the following recipe:

TABLE V

| | |
|---|---|
| 1,3-butadiene, parts by weight | 12 |
| Styrene, parts by weight | 88 |
| Cyclohexane, parts by weight | 1000 |
| n-Butyllithium, mhm. | 1.05 |
| Temperature, °F. | 158 |
| Time, hours | 18 |
| Conversion, percent | 100 |

All recipe ingredients were charged initially. The polymerization was conducted in an atmosphere of nitrogen. At the conclusion of the polymerization, the reaction was shortstopped with an isopropyl alcohol solution containing one part by weight per 100 weight parts polymer of tris-nonylphenyl phosphite and two parts by weight per 100 weight parts polymer of thio-bis phenol. The polymer was coagulated in isopropyl alcohol, separated, and dried.

EXAMPLE IV

A rubbery 75/25 butadiene/styrene block copolymer was treated in solution with ethylaluminum dichloride. The recipe was as follows:

TABLE VI

| | Parts by weight |
|---|---|
| 75/25 butadiene/styrene block copolymer | 100 |
| Toluene | 1437 |
| Ethylaluminum dichloride (11.8 [1]) | 1.5 |
| Temperature, ° C. | 50 |
| Time, hours | 2 |

[1] Gram millimoles per 100 grams of copolymer.

The treated block copolymer was coagulated with isopropyl alcohol, separated, and dried in a vacuum oven at 60° C. Inherent viscosity and gel determinations were made on the polymer before and after treatment with ethylaluminum dichloride. Results were as follows:

TABLE VII

| | Inherent viscosity [1] | Gel [2] wt. percent |
|---|---|---|
| Before treatment | 1.03 | 0 |
| After treatment | 1.60 | 0 |

[1] Same as footnote (2), Table II, Example I.
[2] Same as footnote (3), Table II, Example I.

An increase in inherent viscosity resulted from treatment of the polymer with ethylaluminum dichloride.

The treated rubber composition (25 parts by weight) was blended with 75 parts by weight of commercial polystyrene ("COSDEN" 550) in a Brabender Plastograph. The mixer chamber was flushed with nitrogen, polystyrene was introduced and mixed until it fluxed, and the treated rubber was then added and blended with the polystyrene at slow speed of the mixer until it fluxed. The vacuum head was closed, the chamber was evacuated, and the materials were mixed 7 minutes with the mixer operating at 100 r.p.m. The mixing temperature varied from an initial temperature of 150° C. to a final temperature of 170° C.

After removing the blend from the mixer, test specimens were prepared from a compression molded sheet as described in Example III. Tensile strength, elongation, and notched Izod impact strength were measured. Results were as follows:

TABLE VIII

| | |
|---|---|
| Tensile strength [1], p.s.i. | 2980 |
| Elongation, percent [2] | 30 |
| Notched Izod impact, ft. lbs./in. [3] | 2.6 |

[1], [2] Same as footnote (4), Table II, Example I.
[3] Determined in accordance with ASTM D-256-56, foot pounds per inch of notch, ⅛-inch bar.

These data show that a resinous composition with good properties was obtained by treating the block copolymer in solution with ethylaluminum dichloride.

The rubbery 75/25 butadiene/styrene block copolymer was prepared as in Example I.

EXAMPLE V

Another rubbery 75/25 butadiene/styrene block copolymer prepared in n-hexane using n-butyllithium as the initiator was treated with ethylaluminum dichloride in solution. The recipe was the same as that used in Example IV and recovery of the treated polymer was the same as described in that example. The product was gel free and had an inherent viscosity of 1.25 [Footnote (2), Table II, Example I].

Commercial polystyrene ("COSDEN" 550) and the treated rubbery block copolymer were blended in a 75/25 weight ratio as described in Example IV. Results of tensile strength, elongation, and notched Izod impact strength were as follows:

TABLE IX

| | |
|---|---|
| Tensile strength, p.s.i.[1] | 3040 |
| Elongation, percent [2] | 36 |
| Notched Izod impact, ft. lbs./in.[3] | 6.4 |

[1], [2] Same as footnote (4), Table II, Example I.
[3] Same as footnote (3), Table VIII, Example IV.

These data demonstrate that a resinous composition with good properties was obtained by treating a rubbery butadiene/styrene block copolymer in solution with ethylaluminum dichloride and blending the product with polystyrene.

Reasonable variations and modifications are possible within the scope of this disclosure without departing from the spirit and scope thereof.

That which is claimed is:

1. A method of substantially increasing the uncured tensile strength of a polymer without producing gel in said polymer, comprising:
   (a) forming a solution of said polymer in a hydrocarbon solvent, said polymer being a polymeric material of at least one rubbery block copolymer formed from about 40 to 95 weight percent of at least one conjugated diene and the remainder at least one monovinyl-substituted aromatic compound, and
   (b) treating said polymer solution with from 0.25 to 25 gram millimoles of a treating agent consisting of $R_mAlX_n$ per 100 grams of said polymer in said solution wherein each R contains up to 20 carbon atoms and is selected from the group consisting of saturated aliphatic, saturated cycloaliphatic, aromatic, and combinations thereof, X is a halogen, $m$ is 1 and $n$ is 2, by mixing said polymer solution and said treating agent together at a temperature of from about 0 to about 125° C.

2. A method according to claim 1 wherein said hydrocarbon solvent is paraffinic, cycloparaffinic, or aromatic hydrocarbon having from 3 to 12 carbon atoms per molecule.

3. A method according to claim 2 wherein said block copolymer contains at least one rubbery block having from 50 to 100 weight percent conjugated diene based on the total weight of said rubbery block, said block copolymer contains at least one resinous block having at least 80 weight percent monovinyl substituted aromatic compound and up to 20 weight percent conjugated diene based on the total weight of said resinous block, said conjugated diene has from 8 to 12 carbon atoms per molecule, said polymer solution contains from about 5 to about 15 weight percent polymer based on the total weight of said solvent and said polymer, said R is saturated aliphatic, saturated cycloaliphatic, or combinations thereof, and X is chlorine, bromine, or iodine.

4. The method according to claim 3 wherein said conjugated diene is butadiene, said monovinyl substituted aromatic compound is styrene, said block copolymer contains at least 50 weight percent butadiene based on the total weight of the block copolymer, said solvent is toluene, and said treating agent is ethylaluminum dichloride.

5. The method according to claim 4 wherein further said treated polymer from said step (b) is (c) recovered, and (d) dry blended with a polystyrene homopolymer at a temperature in the range of from about 140 to about 260° C.

References Cited
UNITED STATES PATENTS

| | | | |
|---|---|---|---|
| 3,211,710 | 10/1965 | Hendriks et al. | 260—85.3 |
| 3,352,944 | 11/1967 | Wheat | 260—876 |
| 3,317,503 | 5/1967 | Naylor | 260—94.3 |
| 3,344,206 | 9/1967 | Short | 260—894 |
| 3,445,543 | 5/1969 | Gruver | 260—876 |
| 3,450,797 | 6/1969 | Schafer | 260—888 |

MORRIS LIEBMAN, Primary Examiner

R. H. ZAITLEN, Assistant Examiner

U.S. Cl. X.R.

260—41.5, 94.7, 876 B

UNITED STATES PATENT OFFICE
CERTIFICATE OF CORRECTION

Patent No. 3,631,142　　　　　Dated　December 28, 1971

Inventor(s)　　Clifford W. Childers

It is certified that error appears in the above-identified patent and that said Letters Patent are hereby corrected as shown below:

Claim 3, Column 13, line 15 (line 9 of claim 3) "from 8 to 12 carbon atoms" should read -- from 4 to 12 carbon atoms --.

Signed and sealed this 27th day of June 1972.

(SEAL)
Attest:

EDWARD M. FLETCHER, JR.　　　　ROBERT GOTTSCHALK
Attesting Officer　　　　　　　Commissioner of Patents